United States Patent [19]

King

[11] Patent Number: 4,692,232
[45] Date of Patent: Sep. 8, 1987

[54] APPARATUS FOR INCREASING THE RESIDENCE TIME OF WASTE LIQUIDS IN AN ELECTRIC TREATER

[76] Inventor: Arthur S. King, 8021 Cherokee La., Leawood, Kans. 66026

[21] Appl. No.: 762,210

[22] Filed: Aug. 5, 1985

[51] Int. Cl.$^4$ .............................................. C25B 9/00
[52] U.S. Cl. .................................. 204/278; 204/275; 204/149
[58] Field of Search ............... 204/275, 278, 229, 230, 204/408, 149, 263, 266, 269, 270

[56] References Cited

U.S. PATENT DOCUMENTS

| | | | |
|---|---|---|---|
| 2,752,308 | 6/1956 | Andrus | 204/197 |
| 3,051,643 | 8/1962 | Bergson | 204/430 |
| 3,274,094 | 9/1966 | Klein | 204/275 |
| 3,510,421 | 5/1970 | Gealt | 204/408 |
| 3,577,332 | 5/1971 | Porter et al. | 204/408 |

Primary Examiner—T. Tung
Attorney, Agent, or Firm—Schmidt, Johnson, Hovey & Williams

[57] ABSTRACT

As industrial waste water is passed through an electric field between a pair of uninsulated electrodes, suspended solids and other constituents are acted upon in a manner that encourages them to flocculate. In order to assure that the water is exposed to the field for a sufficient period of time, a normally closed shut-off valve in the outlet of the treater stays closed until electrolysis commences, whereupon gas pressure from such action actuates a diaphragm member which in turn closes a switch to open the outlet valve. A float control associated with the inlet of the treater responds to the drop in water level within the treater by opening an inlet valve to permit the introduction of additional liquid.

3 Claims, 1 Drawing Figure

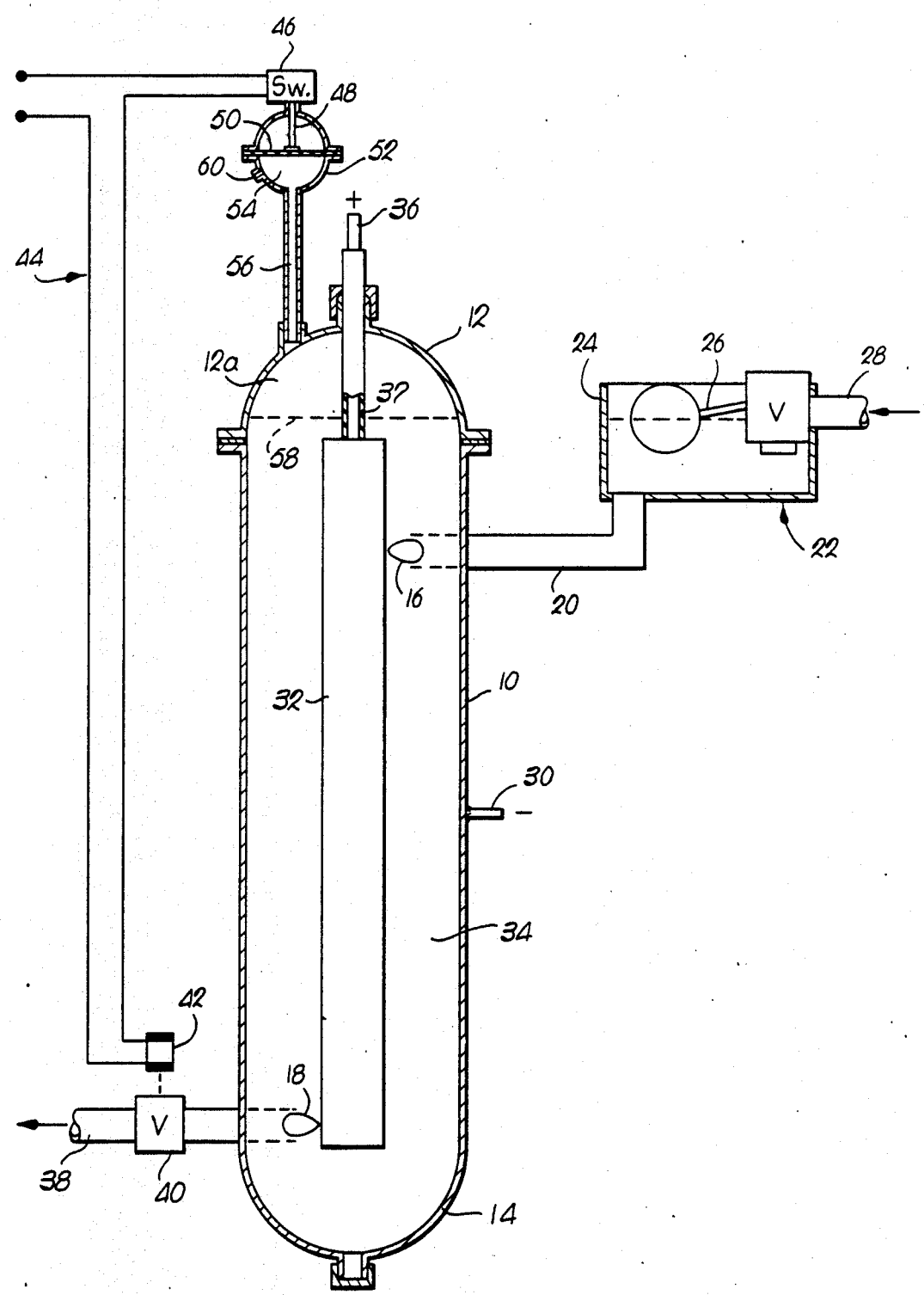

APPARATUS FOR INCREASING THE RESIDENCE TIME OF WASTE LIQUIDS IN AN ELECTRIC TREATER

TECHNICAL FIELD

This invention relates to the treatment of industrial waste water by passing the same through an electric field and, more particularly, to a method and apparatus for increasing the effect of the electric field on such liquid by increasing the amount of time a liquid is exposed to the effects of such field.

BACKGROUND

It has been found that exposing industrial waste waters to an electric field has the effect of promoting flocculation of suspended solids and other constituents from the water. However, I have now determined that there is also a relationship between the amount of time which such water is exposed to the field and the extent to which flocculation occurs. Without giving the water sufficient exposure to the field, flocculation is minimal; on the other hand, if the water is exposed too long, extensive electrolysis will occur and plating out on the electrodes takes place.

SUMMARY OF THE PRESENT INVENTION

Accordingly, one important object of the present invention is to provide method and apparatus for holding the waste water within the electric field on a temporary basis instead of rushing the liquid quickly therethrough such that flocculation is promoted and encourage beyond that which has heretofore been achieved. In this respect, it is also an important object to adapt the treating system for different types of substances, concentrations, and materials found within the waste water by retaining the water within the field only for a period of time sufficient to commence electrolysis, which may differ from time-to-time depending upon the nature of the constituents of the water and their various concentrations. In this respect, then, the water is held within the field only until electrolysis commences, whereupon the generation of gas pressure is used to actuate control mechanism that opens the discharge outlet and premit the continuation of flow through the treater.

BRIEF DESCRIPTION OF THE DRAWINGS

The single FIGURE of the drawing is a schematic, vertical cross-sectional view of treating apparatus in accordance with the principles of the present invention and capable of novel method.

DETAILED DESCRIPTION

The treating apparatus of the present invention includes an upright, generally cylindrical tank 10 having upper and lower domed ends 12 and 14 respectively. A tangential inlet 16 is disposed generally adjacent the upper end 12, while a tangential outlet 18 is disposed generally adjacent the lower end 14. Inlet 16 is connected through a supply line 20 to a liquid level control broadly denoted by the numeral 22 and including a holding reservoir 24 and a float valve 26 operably associated with a feeder line 28 which supplies waste water to the reservoir 24. The reservoir 24 is so situated relative to the tank 10 that the upper level of liquid within the latter can be made to easily correspond to that within the reservoir 24 as controlled by the float valve 26. That is, the level at which float valve 26 shuts off feeder line 28 corresponds to the level of liquid allowed to accumulate within the tank 10.

The tank 10 is constructed from an electrically conductive material and is provided with a conductor 30 leading to one side of a source of electrical potential such that the tank 10 effectively serves as one electrode to the treater. On the other hand, a second electrode of the treater is denoted by the numeral 32 and is suspended concentrically within the tank 10 so as to define an annular treating region 34 through which the liquid must pass as it moves from the inlet 16 to the outlet 18. A conductor 36 connected to the upper end of the electrode 32 and surrounded by a dielectric sheath 37 leads to the opposite side of the source of electrical potential so that the electrode 32 and the tank 10 are oppositely electrically charged to establish an electric field within the treating region 34. Note that the domed upper end 12 of the treater 10 is electrically insulated from the lower portion thereof such that any contact between conductor 36 and the domed upper end 12 does not short circuit the system.

In accordance with the principles of the present invention the outlet 18 is provided with a discharge line 38 having a shut-off valve 40 therein which, when closed, prevents escape of all liquid from the treating region 34. Valve 34 is operated by a solenoid 42 powered by an electrical circuit broadly denoted by the numeral 44, including a switch 46 having an actuating plunger 48. When switch 46 is closed by retraction of the plunger 48 (upward from its position in the drawing), the solenoid 42 is energized to open the valve 40. Thus, solenoid 42, circuit 44, and switch 46 comprise a portion of what may be broadly termed mechanism for actuating the valve 40 to open and close the same.

Another portion of the mechanism for operating the valve 40 includes a transverse, flexible diaphragm device 50 spanning the interior of a housing 52 whose upper end telescopically receives the switch plunger 48. The lower end of the housing 52 defines an internal, gas pressure chamber 54 which, via a tubular passage 56, communicates the underside of the diaphrahm 50 with the gas accumulating space 12a under the domed end 12 and above the liquid level indicated by the dashed lines 58 in the treater 10. A bleed port 60 in housing 52 communicates the chamber 54 thereof with the atmosphere on a continuous basis, the size of such bleed port 60 preferably being adjustable such that the extent of on-going communication of the chamber 54 with the atmosphere can be closely regulated and controlled.

Waste water containing suspended solids and other chemical constituents enters the treating system through the feeder line 28, the reservoir 24, and conduit or supply line 20. The outlet valve 40 is normally closed such that the liquid level 58 within the tank 10 rises to the indicated position, whereupon the float valve 26 shuts off feeder line 28. The liquid contained within the treating region 34 thereupon becomes exposed to the electric field existing between the tank wall 10 and the electrode 32, which has the effect of encouraging the particles to combine with one another and flocculate. Because both the tank wall 10 and the electrode 32 are uninsulated, electrolysis begins to take place, and gas bubbles rise within the treater into the domed space 12a and up the passage 56 into the pressure chamber 54. When the pressure level becomes adequate to flex the membrane 50 upwardly, such flucture depresses the plunger 48, closing the switch 46 and opening the valve 40 via solenoid 42 to commence discharge of the liquid from within the treater. As soon as the liquid level 58 begins to fall within the treater, the float switch 26 opens feeder line 28 and additional liquid is permitted to enter.

So long as sufficient gas bubbles continue to be generated, the diaphragm 50 will remain flexed upwardly and thus the outlet valve 40 open such that continuous flow of the liquid may occur. The bleed port 60 continuously discharges the trapped gas to the atmosphere in a predetermined amount or rate such that fresh gas is required as time progresses to keep the diaphragm 50 flexed upwardly.

In the event that the rate of gas generation falls below that level necessary to flex the diaphragm 50 upwardly, outlet valve 40 will close, allowing the liquid contents of the treater to remain essentially stationary within the treating region 34 in continued exposure to the electric field. Once electrolysis has commenced adequately on the freshly introduced liquid such that diaphragm 50 becomes flexed upwardly, the discharge valve 40 will be reopened to allow the discharge of liquid from the treater. Ideally, and for most industrial waste waters such as those coming from a washing station utilizing various detergents and water for cleaning the inside of over-the-road chemical-hauling vehicles, the liquid resides within the treater for at least 15 second such that electrolysis just begins to commence but does not continue for such prolonged period of time that significant plating out can occur on either the tank wall 10 or the electrode 32.

I claim:

1. In a treater for exposing industrial waste water to an electric field to promote flocculation of solids therefrom, the improvement comprising:

means defining a pair of spaced electrodes having a treating region therebetween;

means for connecting said electrodes across a source of electrical potential to oppositely charge the electrodes and establish said electric field within said treating region;

inlet means for introducing waste water to said region for treatment by electrolysis, causing the formation of gas;

outlet means for discharging treated water from said region; and flow control means operably associated with said outlet means for regulating the residence time of water within said region, said control means having a shut-off valve and mechanism for opening and closing said valve in response to the generation of gas from the water during treatment thereof.

2. In a treater as claimed in claim 1, wherein said device includes a diaphram in gas-flow communication with said treating region, said valve being electrically powered and provided with a switch coupled with said diaphragm for opening and closing an electrical circuit connected with said valve, said valve being normally closed and being operable upon actuation of said diaphragm by the presence of gas generated during treatment of water within said region.

3. In a treater as claimed in claim 2, wherein said diaphragm is provided with a gas pressure chamber on one side thereof communicating with said treating region, said chamber having a bleed port therein for exhausting accumulating gas from the chamber at a predetermined rate.

* * * * *